United States Patent
Ariga

(10) Patent No.: US 8,941,988 B2
(45) Date of Patent: Jan. 27, 2015

(54) ELECTRONIC APPARATUS AND COVER

(75) Inventor: Koji Ariga, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 258 days.

(21) Appl. No.: 13/339,329

(22) Filed: Dec. 28, 2011

(65) Prior Publication Data

US 2012/0218693 A1 Aug. 30, 2012

(30) Foreign Application Priority Data

Feb. 28, 2011 (JP) ................................ 2011-042468

(51) Int. Cl.
G06F 1/16 (2006.01)
H05K 5/00 (2006.01)
H05K 7/00 (2006.01)
A45C 11/00 (2006.01)

(52) U.S. Cl.
CPC ...... *G06F 1/1626* (2013.01); *G06F 2200/1633* (2013.01); *A45C 2011/003* (2013.01); *A45C 2200/15* (2013.01)
USPC ............ 361/679.56; 361/679.02; 361/679.21; 361/679.26; 361/679.29

(58) Field of Classification Search
USPC ............ 361/679.01, 679.02, 679.06, 679.07, 361/679.08, 679.09, 679.15, 679.16, 361/679.17, 679.2, 679.21, 679.26, 679.27, 361/679.29, 679.3, 679.56, 725, 726, 727, 361/825
See application file for complete search history.

(56) References Cited

U.S. PATENT DOCUMENTS 8,328,008 B2 * 12/2012 Diebel et al. ............... 206/45.24
2006/0007645 A1 1/2006 Chen et al.

FOREIGN PATENT DOCUMENTS

| JP | 6372977 | 5/1988 |
|---|---|---|
| JP | H10-65356 A | 6/1998 |
| JP | H11-212669 A | 8/1999 |
| JP | 3092458 B | 9/2000 |
| JP | 3164812 B | 5/2001 |
| JP | 3082663 U | 10/2001 |
| JP | 2003-168876 A | 6/2003 |
| JP | 2006-024178 A | 1/2006 |
| JP | 2006-055552 A | 3/2006 |
| JP | 2006-155050 A | 6/2006 |
| JP | 2007-127980 A | 5/2007 |
| JP | 2009-178373 A | 8/2009 |
| JP | 2012-043182 A | 3/2012 |

OTHER PUBLICATIONS

Notification of Reasons for Refusal drafted May 21, 2012, in corresponding Japanese Pat. App. No. 2011-042468, in 7 pages.

* cited by examiner

*Primary Examiner* — Hoa C Nguyen
*Assistant Examiner* — Binh Tran
(74) *Attorney, Agent, or Firm* — Knobbe, Martens, Olson & Bear LLP

(57) ABSTRACT

According to one embodiment, an electronic apparatus includes a main body, a cover, and a storage portion. The main body includes a display unit. The cover includes a first surface at which the main body is supported, and a second surface on which the main body is placed. The storage portion is provided between the first and second surfaces. The cover includes a first use mode in which the display unit is covered, and a second use mode in which the display unit is exposed, and the first and second surfaces are rotatable with respect to each other in the second use mode.

12 Claims, 7 Drawing Sheets

ELECTRONIC APPARATUS AND COVER

CROSS REFERENCE TO RELATED APPLICATION(S)

This application is based upon and claims the benefit of priority from Japanese Patent Application No. 2011-042468, filed on Feb. 28, 2011, the entire contents of which are incorporated herein by reference.

FIELD

Embodiments described herein relate generally to an electronic apparatus and a cover.

BACKGROUND

An electronic apparatus includes a protection cover for protecting a liquid crystal display of a main body of the electronic apparatus and is capable of being placed in a stand-up state on a desk by rotating the protection cover.

In recent years, electronic apparatuses have been reduced in size and weight, thereby increasing opportunities to take out electronic apparatuses and connect the electronic apparatuses to other apparatuses at places away from home or office. Accordingly, accessories necessary to use such electronic apparatuses are also desired to be easily carried along together with the electronic apparatuses in expectation of improvement in convenience of users.

BRIEF DESCRIPTION OF THE SEVERAL VIEWS OF THE DRAWINGS

A general configuration that implements the various features of the invention will be described with reference to the drawings. The drawings and the associated descriptions are provided to illustrate embodiments of the invention and not to limit the scope of the invention.

DETAILED DESCRIPTION

In general, according to one embodiment, an electronic apparatus includes a main body, a cover, and a storage portion. The main body includes a display unit. The cover includes a first surface at which the main body is supported, and a second surface on which the main body is placed. The storage portion is provided between the first and second surfaces. The cover includes a first use mode in which the display unit is covered, and a second use mode in which the display unit is exposed, and the first and second surfaces are rotatable with respect to each other in the second use mode.

Hereinafter, exemplary embodiments will be described with reference to the drawings. In the following description, a monitor 1 for outputting content data will be described as an example of an electronic apparatus. Herein, as seen from a user who uses a personal computer 5 at a position facing the monitor 1, an upward direction is defined as "upward", a downward direction is defined as "downward", the left side is defined as "left", the right side is defined as "right", the front side is defined as "front", and the depth side is defined as "depth".

Figure 1:
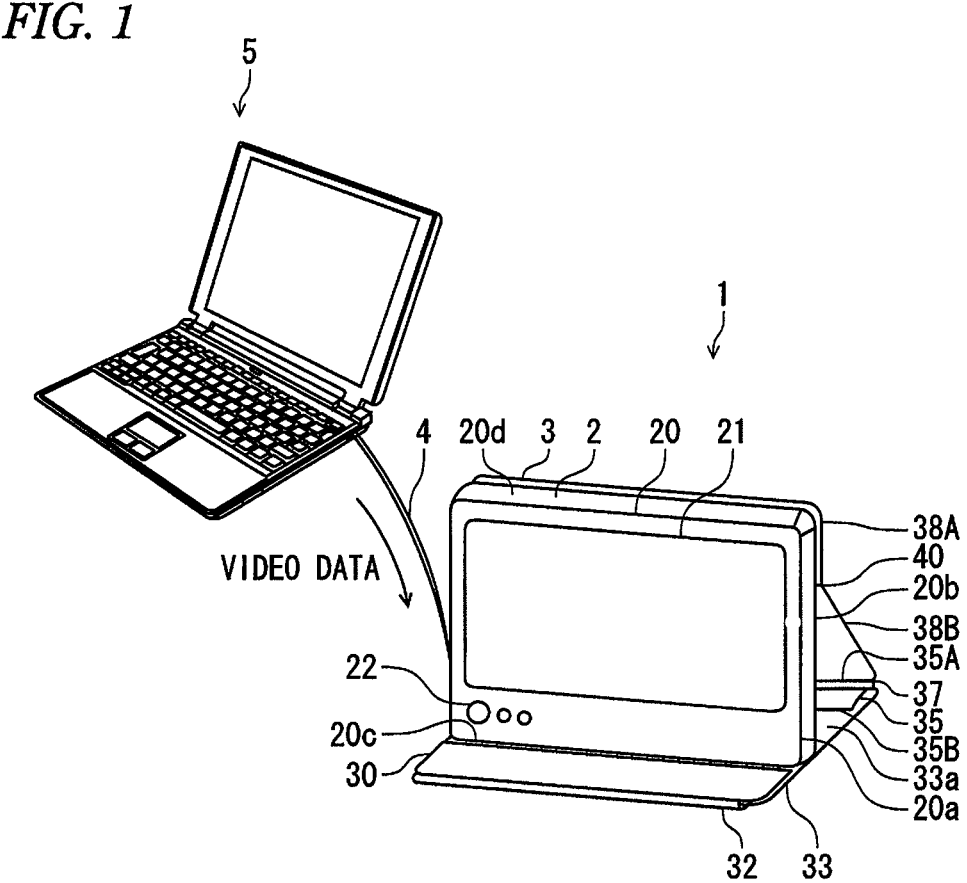
FIG. 1 is an exemplary diagram illustrating a configuration of a communication system according to an embodiment.

FIG. 1 is a diagram illustrating a configuration of a communication system according to an embodiment. The communication system is implemented by the monitor 1 and the personal computer 5. The monitor 1 includes a monitor main body 2, and a protection cover 3 provided at the monitor main body 2. The personal computer 5 is capable of carrying out various types of information processing, one of which is the function of reproducing video data. The monitor 1 and the personal computer 5 are connected to each other via a cable 4. The cable 4 is compliant with USB (Universal Serial Bus) standards, for example. Video data reproduced by the personal computer 5 is outputted to the monitor 1 via the cable 4. The monitor 1 outputs the inputted data to a display 21.

In the present embodiment, the monitor 1 includes the monitor main body 2, and the protection cover 3 for covering the monitor main body 2. The monitor main body 2 has a case 20, the display 21, and an operation button 22. The case 20 has an approximately rectangular parallelepiped shape. A surface of the case 20, at which the display 21 is provided, will be referred to as a "surface 20a", a surface of the case 20, opposite to the surface 20a, will be referred to as a "rear surface 20b", a surface of the case 20, located at a lower position in FIG. 1, will be referred to as a "lower surface 20c", and a surface of the case 20, located at an upper position in FIG. 1, will be referred to as an "upper surface 20d". FIG. 1 illustrates a "stand use" state in which the monitor 1 is used while the protection cover 3 is opened to allow the monitor main body 2 to stand up.

First, the stand use of the monitor 1 will be described. The protection cover 3 has: a stopper 30, a connecting portion 32, a stand base 33, a cable storage portion 35, a connecting portion 37, and a support surface 38. The stopper 30 is connected to the stand base 33 via the connecting portion 32, and is placed on the stand base 33 at the time of the stand use. Specifically, upon placement of the stopper 30 on the stand base 33, the stopper 30 forms a convex portion on the stand base 33, and abuts against the monitor main body 2, thereby maintaining the stand-up state of the monitor main body 2.

The stopper 30 and the stand base 33 are connected to each other through the connecting portion 32, and the stopper 30 is placed on the stand base 33 via the elastically deformed connecting portion 32. The stand base 33 provides a surface that comes into contact with a desk at the time of the stand use, and the lower surface 20c, is placed on an inner surface 33a, of the stand base 33. The inner surface 33a, is formed of a material having a high friction coefficient, thus making it difficult for the lower surface 20c, to slide. Accordingly, even when the monitor main body 2 is not abutted against the stopper 30, the monitor main body 2 can be maintained in the stand-up state.

The cable storage portion 35 is made of an elastically deformable material and has a rectangular shape. An end portion 35A of the cable storage portion 35, serving as a long side thereof, is connected to the connecting portion 37. An end portion 35B of the cable storage portion 35, opposite to the end portion 35A, is not fixed to any other part and is thus rotatable. Further, the end portion 35B is provided with an adhesion part, and the end portion 35B is rotated so that the adhesion part is adhered to the connecting portion 37, thereby allowing the cable storage portion 35 to be deformed into a cylindrical shape. In the following description, the adhesion part is herein a hook-and-loop fastener or the like, for example, which is allowed to be attached and detached more than once. When the cable storage portion 35 is in a rounded state, the cable 4 and the like can be contained inside the cable storage portion 35. The stand base 33 and the support surface 38 are connected to each other through the connecting portion 37. The connecting portion 37 is elastically deformable, and a rotation angle thereof between the stand base 33 and the support surface 38 can be changed. Furthermore, the connecting portion 37 is formed of a material to which the adhesion part provided at the cable storage portion 35 can adhere.

The support surface 38 is bent along a bending line 40 and is thus divided into a support surface 38A and a support surface 38B. The support surface 38A is adhered to the rear surface 20b, of the monitor main body 2 via an unillustrated adhesion part. The support surface 38B is formed between the support surface 38A and the connecting portion 37, and supports the monitor main body 2.

Figure 2:
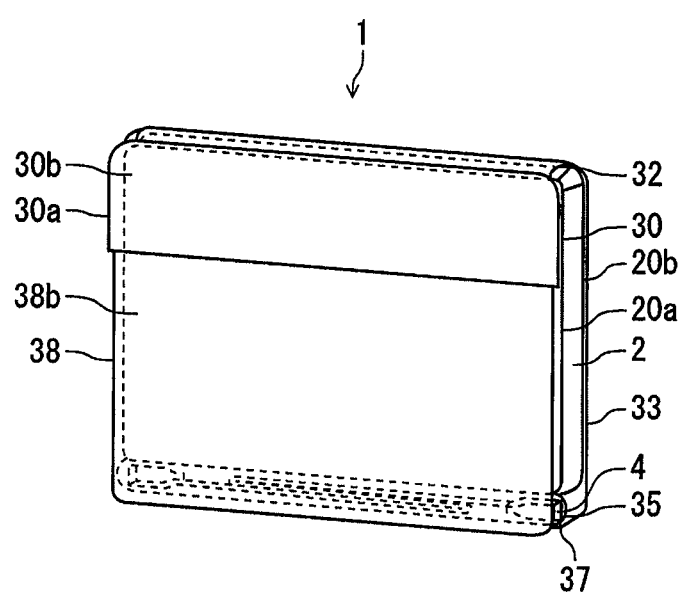
FIG. 2 is an exemplary external view of a monitor when a protection cover according to the embodiment is closed.

Next, portable use of the monitor 1 will be described with reference to FIG. 2. FIG. 2 is an external view of the monitor 1 when the protection cover 3 according to the present embodiment is closed.

In the portable use, an outer surface 38b, of the support surface 38 is adhered to an inner surface 30a, of the stopper 30, thus covering the periphery of the monitor main body 2 with the protection cover 3. The monitor main body 2 is adhered to the support surface 38A via an adhesion part provided on the rear surface 20b, of the case 20, thus fixing the monitor main body 2 to the protection cover 3. Moreover, the stand base 33 and support surface 38 of the protection cover 3 are each greater than the surface 20a, of the case 20 of the monitor main body 2. Accordingly, when the monitor 1 is covered with the protection cover 3, space is formed below the monitor main body 2. In this space, the cable storage portion 35 is formed into a rounded shape and the end portion 35B is adhered to the connecting portion 37, thereby allowing the cable 4 to be contained in the cable storage portion 35. In other words, also when the protection cover 3 is opened, the cable 4 is held inside the cable storage portion 35.

Figure 3:
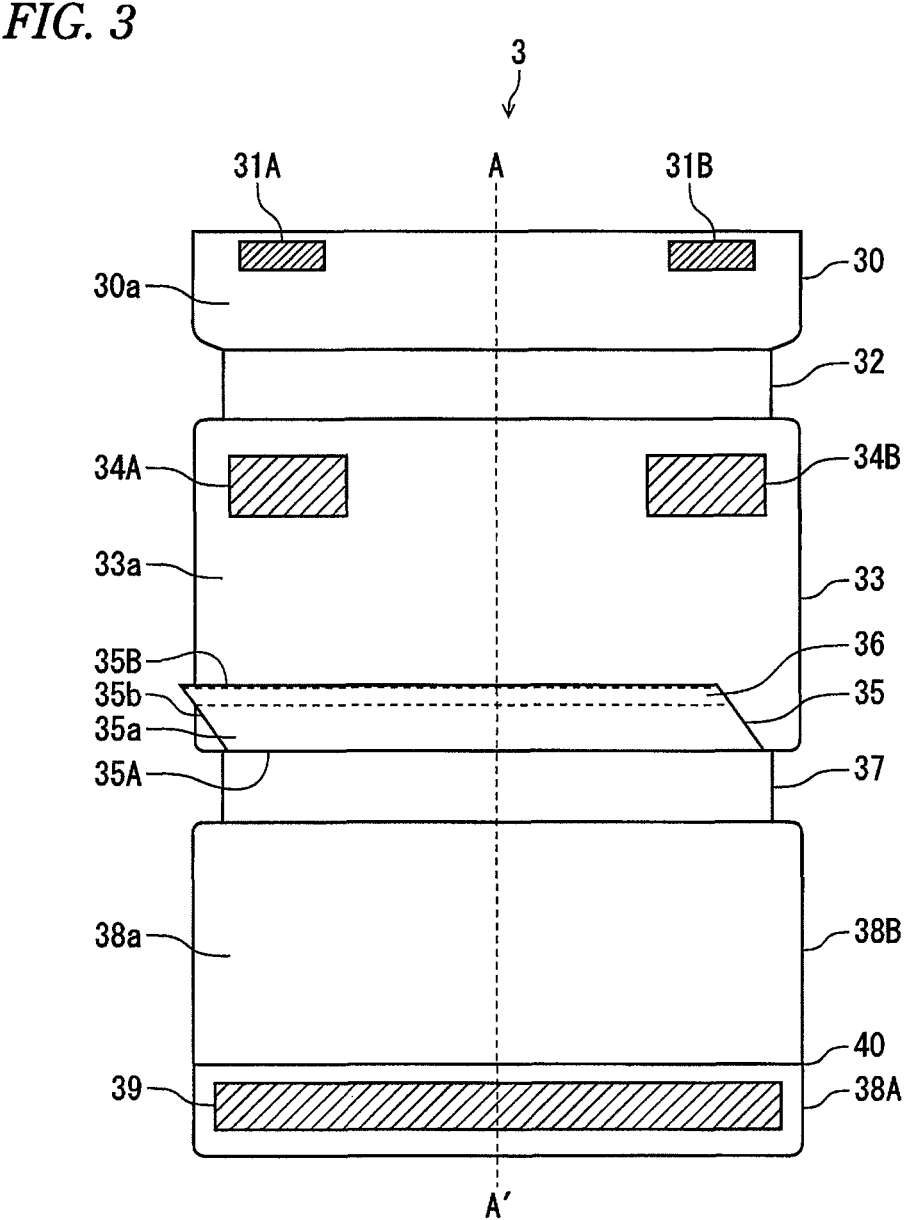
FIG. 3 is an exemplary diagram illustrating an inner surface of the protection cover according to the embodiment.

Next, a structure of the protection cover 3 will be described with reference to FIG. 3. FIG. 3 is a diagram illustrating an inner surface of the protection cover 3 according to the present embodiment. This inner surface means the surface of the protection cover 3, which is located at an inward position at the time of the portable use. Specifically, in FIG. 3, the adhesion between the stopper 30 and the support surface 38 is broken from the portable use state illustrated in FIG. 2, the stopper 30 is rotated upward, and the support surface 38 is rotated downward, so that the protection cover 3 is opened.

The protection cover 3 is formed by connecting the stopper 30, the connecting portion 32, the stand base 33, the cable storage portion 35, the connecting portion 37 and the support surface 38. The inner surface of the stopper 30 is provided with two laterally separated adhesion parts 31A and 31B. The connecting portion 32 is formed so as to be elastically deformable, thus allowing the stopper 30 to be superposed on the inner surface 30a, of the stand base 33 by rotating the stopper 30 by 180 degrees as illustrated in FIG. 1 from the state where the stopper 30 and the stand base 33 are arranged side by side as illustrated in FIG. 3.

The stand base 33 provides a surface located below the monitor main body 2 at the time of the stand use, and the inner surface 33a, of the stand base 33 is made of a material having a high friction coefficient. Further, the stand base 33 is formed to have a rigid shape and is thus capable of protecting the display 21 of the monitor main body 2, which faces the stand base 33 at the time of the portable use. Furthermore, the inner surface of the stand base 33 is provided with two laterally separated adhesion parts 34A and 34B that are allowed to adhere to the adhesion parts 31A and 31B of the stopper 30, respectively.

The cable storage portion 35 is formed by connecting the end portion 35A to the connecting portion 37, and the end portion 35B is rotatable. An outer surface 35b, of the cable storage portion 35 is provided with an adhesion part 36. The end portion 35B is rotated and the adhesion part 36 is adhered to the connecting portion 37, thereby enabling formation of the space in which the cable 4 is containable. An inner surface 35a, of the cable storage portion 35 is a surface that comes into contact with the cable 4 when the cable 4 is contained in the cable storage portion 35.

The connecting portion 37 is formed so as to be elastically deformable, thus allowing the support surface 38 to be rotated at any angle from the state in which the stand base 33 and the support surface 38 are arranged side by side as illustrated in FIG. 3. A feature that enables adjustment of the angle of the monitor main body 2, which is adhered to the support surface 38A, by elastic deformation of the connecting portion 37 will be described later. The support surface 38 is bent along the bending line 40. A region of the support surface 38 adjacent to the connecting portion 37 is referred to as the support surface 38B, and a remaining region of the support surface 38 is referred to as the support surface 38A. A region of an inner surface 38a, of the support surface 38, corresponding to the support surface 38A, is provided with an adhesion part 39.

The adhesion part 39 is adhered to an adhesion part 23 provided at the rear surface 20b, of the monitor main body 2. Unlike the two separated adhesion parts 31 (31A and 31B) and the two separated adhesion parts 34 (34A and 34B), the adhesion part 39 is provided as the single unseparated adhesion part. The adhesion part 39 is provided in this manner so as to allow a user to identify the surface to which the monitor main body 2 is to be adhered. Instead of the monitor main body 2, the adhesion parts 31 (31A and 31B) provided at the stopper 30 are adhered to the two separated adhesion parts 34 (34A and 34B), which indicates that the adhesion parts 34 (34A and 34B) do not serve as surfaces to which the monitor main body 2 is adhered. However, it is conceivable that the monitor main body 2 is adhered to the adhesion parts 34 (34A and 34B) by mistake by the user. So as to protect the display 21 of the monitor main body 2 even in such a case, the support surface 38 is also formed to have a rigid shape.

Figure 4:
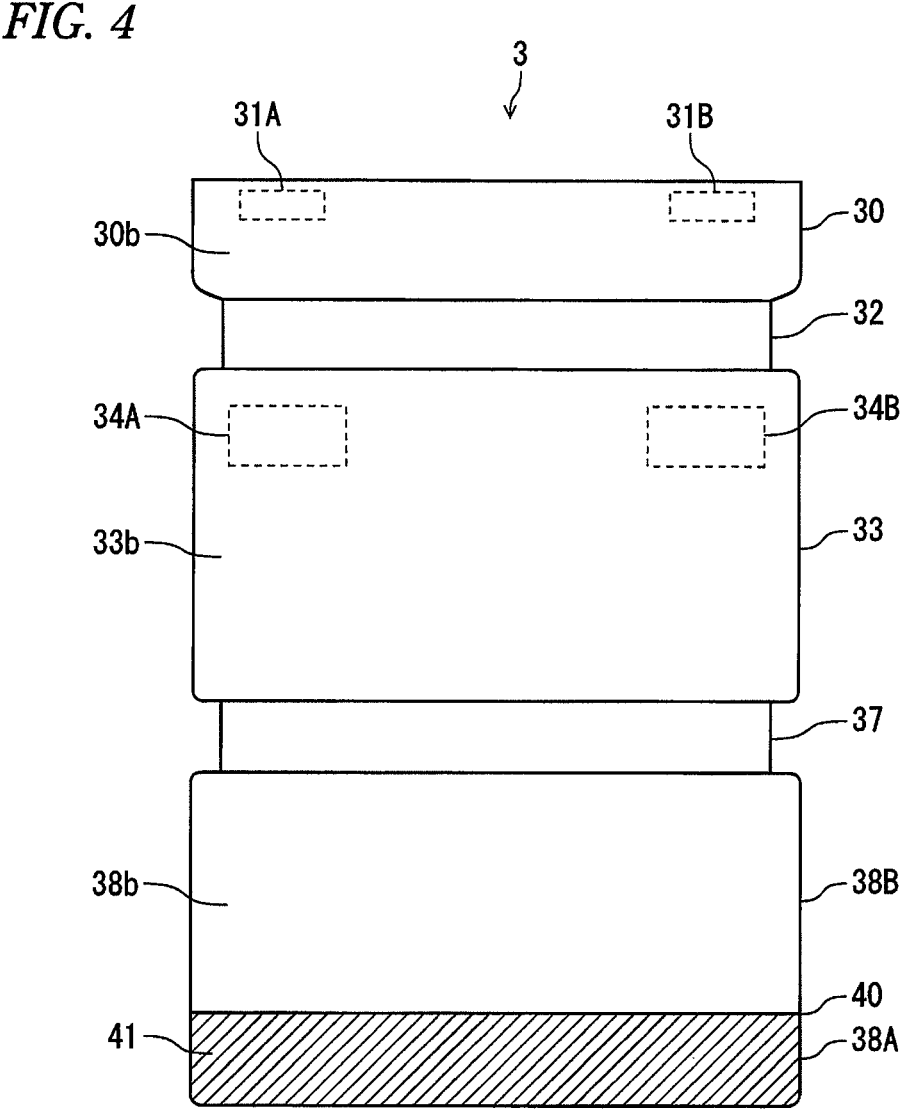
FIG. 4 is an exemplary diagram illustrating an outer surface of the protection cover according to the embodiment.

Next, an outer surface of the protection cover 3 will be described with reference to FIG. 4. FIG. 4 is a diagram illustrating an outer surface of the protection cover 3 according to the present embodiment. This outer surface means the surface of the protection cover 3, which is located at an outward position at the time of the portable use.

At an outer surface 30b, of the stopper 30, the positions of the adhesion parts 31 (31A and 31B) provided at the inner surface 30a, of the stopper 30 are indicated by the dotted lines. Further, at an outer surface 33b, of the stand base 33, the positions of the adhesion parts 34 (34A and 34B) provided at the inner surface 33a, of the stand base 33 are also indicated by the dotted lines. At a region of the outer surface 38b, of the support surface 38, corresponding to the support surface 38A, an adhesion part 41 is provided. The adhesion part 41 is adhered to the adhesion parts 31 (31A and 31B) at the time of the portable use, thereby allowing ends of the protection cover 3 to be fastened to each other.

Figure 5A:
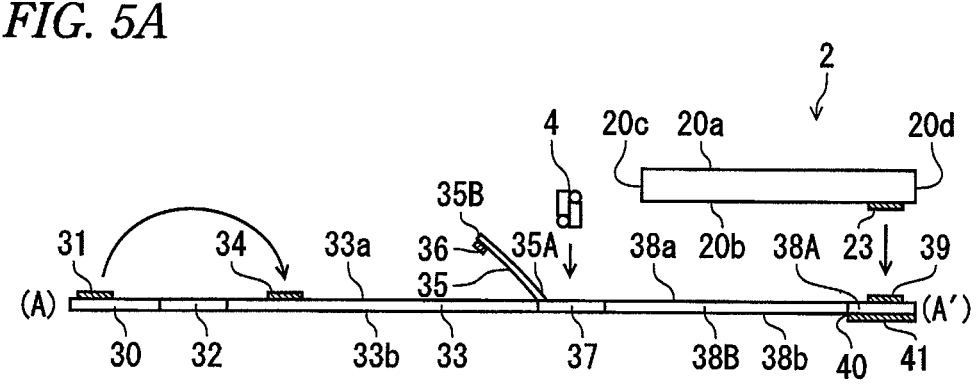
FIGS. 5A and 5B are exemplary diagrams describing the procedure for a stand use of the protection cover according to the embodiment.
Figure 5B:
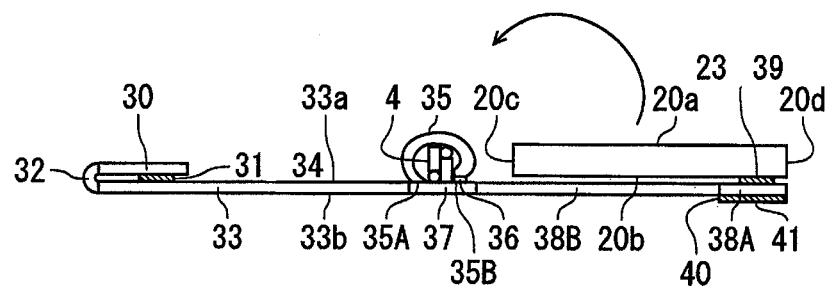
Figure 6A:
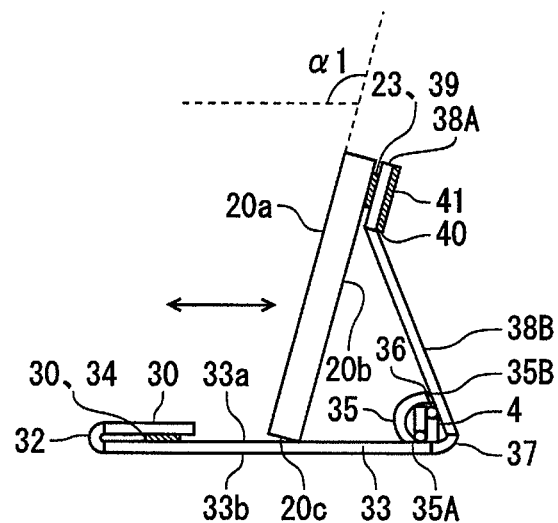
FIGS. 6A and 6B are exemplary diagrams describing the procedure for the stand use of the protection cover according to the embodiment.
Figure 6B:
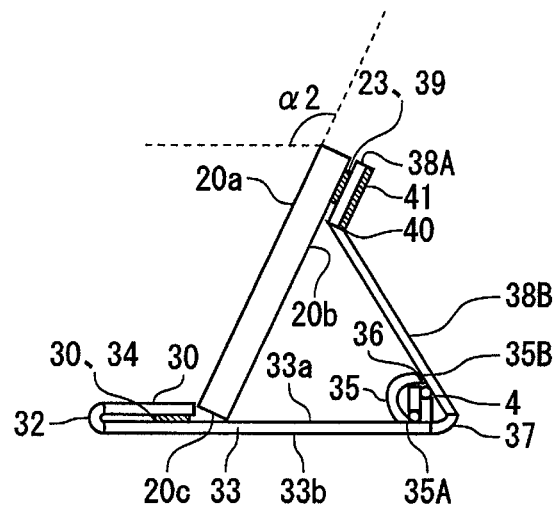

Next, an assembly procedure for the stand use of the protection cover 3 will be described with reference to FIGS. 5A and 5B and FIGS. 6A and 6B. FIGS. 5A and 5B are diagrams describing first and second steps of the procedure for the stand use of the protection cover 3 according to the present embodiment. In addition, FIGS. 6A and 6B are diagrams describing third and fourth steps of the procedure for the stand use of the protection cover 3 according to the present embodiment. FIGS. 5A and 5B and FIGS. 6A and 6B each provide a cross-sectional view of the protection cover 3, taken along the line A-A' of FIG. 3. In each of FIGS. 5A and 5B and FIGS. 6A and 6B, the upper side of the protection cover 3 is the inner surface thereof, and the lower side of the protection cover 3 is the outer surface thereof. Hereinafter, the assembly steps for the stand use will be described as four individual steps 1, to 4.

(Step 1) In a lower area of FIG. 5A, a cross-sectional view of the opened protection cover 3 is provided. In an upper area of FIG. 5A, cross-sectional views of the monitor main body 2 and the cable 4, which are to be contained in the protection cover 3, are provided. The adhesion part 23 provided at the rear surface 20b, is adhered to the adhesion part 39 provided at the support surface 38A, thereby fixing the monitor main body 2 to the protection cover 3. The cable 4 is placed on the connecting portion 37 and the adhesion part 36 provided at the end portion 35B of the cable storage portion 35 is adhered to the connecting portion 37, thereby containing the cable 4 in the cable storage portion 35. Further, the stopper 30 is superposed on the stand base 33 and the adhesion parts 31 (31A and 31B) provided at the inner surface 30a, of the stopper 30 are adhered to the adhesion parts 34 (34A and 34B) provided at the inner surface 33a, of the stand base 33, thereby forming a convex portion on the stand base 33.

(Step 2) FIG. 5B illustrates a state where the monitor main body 2 and the cable 4 are held by the protection cover 3 and the stopper 30 is superposed on the stand base 33. From this state, the monitor main body 2 is moved so that the lower surface 20c, comes into contact with the inner surface 33a, of the stand base 33. In order to place the lower surface 20c, on the inner surface 33a, the lower surface 20c, must be moved beyond the cable storage portion 35 in which the cable 4 is contained. Accordingly, the support surface 38 is bent along the bending line 40 so as to ensure a distance between the rear surface 20b, and the inner surface 38a, of the support surface 38. Thus, since the cable storage portion 35 is provided between the stand base 33 and the support surface 38 and located behind the monitor main body 2 as seen from the user, the cable storage portion 35 will not interfere with visual recognition of the display 21.

(Step 3) FIG. 6A illustrates a state where the lower surface 20c, of the monitor main body 2 is placed on the inner surface 33a, of the stand base 33. Since the inner surface 33a, of the stand base 33 is formed of a high friction coefficient material, the lower surface 20c, can be stopped at any position on the inner surface 33a. At the position of the monitor main body 2 illustrated in FIG. 6A, an angle formed between the stand base 33 and the surface 20a, is α1. The monitor main body 2 is movable in the direction indicated by the arrows in FIG. 6A and is thus adjustable to any angle desired by the user.

(Step 4) FIG. 6B illustrates a state where the monitor main body 2 is brought into contact with the stopper 30 when the monitor main body 2 is moved toward the stopper 30 from the state of Step 3. At the position of the monitor main body 2 illustrated in FIG. 6B, an angle formed between the stand base 33 and the surface 20a, is α2. With the stopper 30 serving as the convex portion on the stand base 33, the monitor main body 2 will not slide beyond the stopper 30, thus ensuring a stable state for the stand use. Thus, the assembly for the stand use of the protection cover 3 is finished.

Figure 7A:
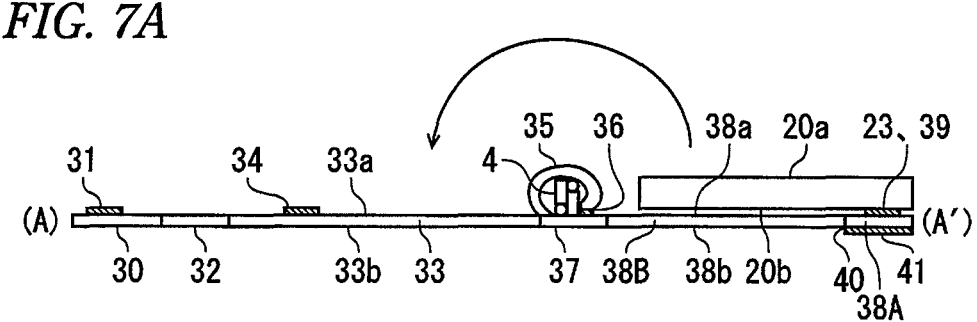
FIGS. 7A to 7C are exemplary diagrams describing the procedure for a portable use of the protection cover according to the embodiment.
Figure 7B:
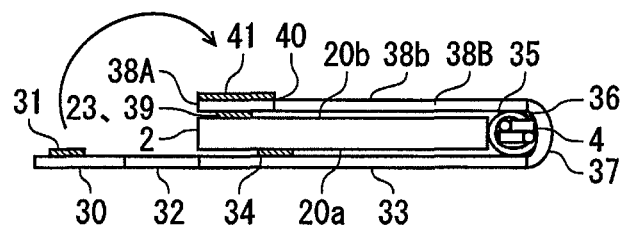
Figure 7C:
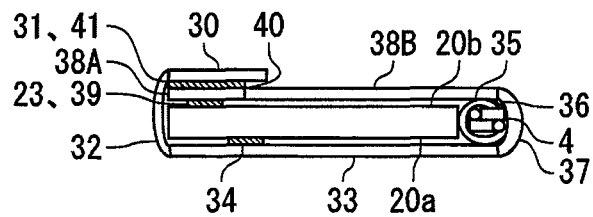

Next, an assembly procedure for the portable use of the protection cover 3 will be described. FIGS. 7A to 7C are diagrams describing the procedure for the portable use of the protection cover 3 according to the present embodiment. Hereinafter, the assembly steps for the portable use will be described as three individual steps 1, to 3.

(Step 1) FIG. 7A illustrates a state where the monitor main body 2 and the cable 4 are held by the protection cover 3. From this state, the monitor main body 2 and the support surface 38 are turned over so that the monitor main body 2 and the support surface 38 face the stand base 33. The connecting portion 37 is deformed by following the movement of the monitor main body 2 and the support surface 38.

(Step 2) FIG. 7B illustrates a state where the monitor main body 2 and the support surface 38 face the stand base 33. The cable storage portion 35 is surrounded by the connecting portion 37, the monitor main body 2, the support surface 38 and the stand base 33.

(Step 3) FIG. 7C illustrates a state where the stopper 30 is superposed on the support surface 38. The adhesion parts 31 (31A and 31B) provided at the inner surface 30a, of the stopper 30 are adhered to the adhesion part 41 provided at the outer surface 38b of the support surface 38. The connecting portion 32 is deformed by following the movement of the stopper 30. The stopper 30 serving as an end portion of the protection cover 3 is adhered to the support surface 38, thereby allowing the peripheries of the monitor main body 2 and the cable storage portion 35 to be surrounded and contained by the protection cover 3. Thus, the assembly for the portable use of the protection cover 3 is finished.

As described above, according to the present embodiment, the protection cover 3 for protecting the monitor main body 2 is provided with the storage portion for containing an accessory such as the cable 4, thereby enabling improvement in convenience. In other words, the display 21 and the like of the monitor main body 2 are protected, and portability is improved; in addition, the storage portion for the accessory is also provided, thus saving the trouble of having to separately carrying around the monitor main body 2 and the accessory.

Further, the protection cover 3 is formed so as to enable not only the portable use but also the stand use in which the monitor main body 2 is allowed to stand up on a desk. With such a structure, in addition to the portability, the visibility of the display 21 and the operability of the operation button 22 are improved. In the protection cover 3 according to the present embodiment, a placement surface (i.e., the stand base 33) and a surface (i.e., the support surface 38) at which the monitor main body 2 is supported are provided so as to be rotatable with respect to each other at the time of the stand use, thus enabling the angle adjustment of the monitor main body 2 adhered to the support surface. The placement surface is formed by a material having a high friction coefficient, thus allowing the monitor main body 2 to be fixed at any position, and allowing the user to more finely adjust the angle of the display 21. Moreover, the convex portion (i.e., the stopper 30) is provided on the placement surface, thus enabling the maintenance of the stand-up state of the monitor main body 2.

In addition, the storage portion (i.e., the cable storage portion 35) for containing the accessory between the placement surface and support surface, which are rotated, is provided so that the monitor main body 2 is closer to the user than the storage portion is, and therefore, the storage portion will not interfere with the visual recognition of the display 21 of the monitor main body 2. Besides, the storage portion is formed of an elastically deformable material, thus allowing various accessories to be contained in the storage portion.

Note that the above description has been made using a monitor as an example of an electronic apparatus, but the present invention is not limited to this example. The present invention may be applied to a slate-type personal computer, for example.

While certain embodiments have been described, these embodiments have been presented by way of example only, and are not intended to limit the scope of the invention. Indeed, the novel apparatus described herein may be embodied in a variety of other forms; furthermore, various omissions, substitutions and changes in the form of the apparatus, described herein may be made without departing from the sprit of the invention. The accompanying claims and their equivalents are intended to cover such forms or modifications as would fall within the scope and sprit of the invention.

What is claimed is:

1. An electronic apparatus comprising:
   a main body comprising a display unit;
   a cover comprising a first surface configured to support an upper portion of the main body and a second surface configured to support a lower portion of the main body; and
   a storage portion between the first and second surfaces, wherein:
      the cover can be configured in a first use mode to cover the display unit and a second use mode to expose the display unit,
      the first and second surfaces are rotatable with respect to each other in the second use mode;
      the cover comprises a third surface adjacent to the second surface, a fourth surface opposite to the first surface, and a connection portion that connects the second surface and the third surface;
      the third surface is configured to be attachable to and detachable from the fourth surface; and
      the third surface is configured to be placed on the second surface and to abut against the main body.

2. The apparatus of claim 1,
   wherein the storage portion comprises an end portion, wherein the storage portion can be configured in a first state in which the end portion is adhered to the cover and a second state in which the end portion is rotatable.

3. The apparatus of claim 1, wherein the storage portion comprises two end portions one of which is connected to the cover; and
   the storage portion is configured to be switched at least between a first state in which the other end portion is adhered to the cover and a second state in which the other end portion is separate from the cover.

4. The apparatus of claim 1, wherein the third surface is configured to be placed on the second surface and to abut against the lower end portion of the main body.

5. The apparatus of claim 1, wherein the third surface is configured to, in the second use mode, be placed on the second surface and abut against the lower end portion of the main body.

6. The apparatus of claim 1, wherein when the third surface is placed on the second surface and abuts against the lower end portion of the main body, a normal line of a surface of the display unit and a normal line of the third surface intersect each other.

7. The apparatus of claim 1, wherein the third surface is rotatable about the connection portion.

8. The apparatus of claim 1, wherein the connection portion is configured to serve as a hinge.

9. A cover comprising:
   a first surface configured to support an electronic apparatus with a display unit;
   a second surface configured for placement of the electronic apparatus; and
   a storage portion between the first and second surfaces, wherein:
      the first surface is rotatable with respect to the second surface,
      the storage portion comprises a rotatable end portion;
      the cover comprises a third surface adjacent to the second surface, a fourth surface opposite to the first surface, and a connection portion that connects the second surface and the third surface;
      the third surface is configured to be attachable to and detachable from the fourth surface; and
      the third surface is configured to be placed on the second surface and to abut against the electronic apparatus.

10. The cover of claim 9, wherein the storage portion comprises two end portions one of which is connected to one of the first and second surfaces; and
    the storage portion is configured to be switched at least between a first state in which the other end portion is adhered to the other of the first and second surfaces and a second state in which the other end portion is separate from the other of the first and second surfaces.

11. The cover of claim 9, wherein the third surface is rotatable about the connection portion.

12. The cover of claim 9, wherein the connection portion is configured to serve as a hinge.

* * * * *